United States Patent
Yoshizawa et al.

(10) Patent No.: US 10,511,757 B2
(45) Date of Patent: Dec. 17, 2019

(54) VIDEO RECORDING DEVICE AND CAMERA FUNCTION CONTROL PROGRAM

(71) Applicant: Maxell, Ltd., Kyoto (JP)

(72) Inventors: Kazuhiko Yoshizawa, Ibaraki (JP); Hirohito Kuriyama, Tokyo (JP)

(73) Assignee: MAXELL, LTD., Kyoto (JP)

( * ) Notice: Subject to any disclaimer, the term of this patent is extended or adjusted under 35 U.S.C. 154(b) by 55 days.

(21) Appl. No.: 15/678,265

(22) Filed: Aug. 16, 2017

(65) Prior Publication Data

US 2017/0347009 A1  Nov. 30, 2017

Related U.S. Application Data

(63) Continuation of application No. 14/917,586, filed as application No. PCT/JP2013/074728 on Sep. 12, 2013, now Pat. No. 9,774,776.

(51) Int. Cl.

| H04N 5/77 | (2006.01) |
|---|---|
| H04N 5/232 | (2006.01) |
| G03B 17/38 | (2006.01) |
| H04N 5/91 | (2006.01) |
| H04N 5/765 | (2006.01) |
| H04N 5/225 | (2006.01) |
| G06F 3/16 | (2006.01) |

(52) U.S. Cl.
CPC ......... *H04N 5/23203* (2013.01); *G03B 17/38* (2013.01); *H04N 5/2258* (2013.01); *H04N 5/232* (2013.01); *H04N 5/23216* (2013.01); *H04N 5/23245* (2013.01); *H04N 5/23293* (2013.01); *H04N 5/765* (2013.01); *H04N 5/77* (2013.01); *H04N 5/772* (2013.01); *H04N 5/91* (2013.01); *G06F 3/167* (2013.01)

(58) Field of Classification Search
USPC ......................................... 386/223, 224, 248
See application file for complete search history.

(56) References Cited

U.S. PATENT DOCUMENTS

| 10,015,400 B2 * | 7/2018 | Kim .................. H04N 5/23219 |
|---|---|---|
| 2005/0128311 A1 | 6/2005 | Rees et al. |
| 2011/0070835 A1 | 3/2011 | Borras et al. |
| 2011/0076003 A1 | 3/2011 | Cho et al. |

(Continued)

FOREIGN PATENT DOCUMENTS

JP  01-191840 A  8/1989

OTHER PUBLICATIONS

International Search Report of PCT/JP2013/074728 dated Dec. 17, 2013.

*Primary Examiner* — Helen Shibru
(74) *Attorney, Agent, or Firm* — Mattingly & Malur, PC

(57) ABSTRACT

A video recording device includes: a first imaging unit (in camera) arranged on a same face as that of a display unit of a casing of the device; a second imaging unit (out camera) arranged on a face different from that of the display unit of the casing of the device; and an audio input unit that inputs a command voice giving an instruction for recording a video signal. A control unit sets a delay time until start of a recording process performed by the recording unit after input of the command voice to be different in accordance with the enabled imaging unit and sets a delay time of a case where the first imaging unit is enabled to be longer than a delay time of a case where the second imaging unit is enabled.

8 Claims, 12 Drawing Sheets

(56) References Cited

U.S. PATENT DOCUMENTS

| | | | |
|---|---|---|---|
| 2012/0229512 A1* | 9/2012 | Hayashi | A63F 13/20 |
| | | | 345/649 |
| 2012/0281129 A1* | 11/2012 | Wang | H04N 5/232 |
| | | | 348/333.01 |
| 2013/0093904 A1* | 4/2013 | Wagner | H04N 5/232 |
| | | | 348/207.11 |
| 2013/0321340 A1* | 12/2013 | Seo | G06F 1/1641 |
| | | | 345/174 |
| 2013/0328997 A1* | 12/2013 | Desai | H04N 7/141 |
| | | | 348/14.02 |
| 2014/0028826 A1 | 1/2014 | Lee et al. | |
| 2014/0232921 A1* | 8/2014 | Kim | H04N 5/23293 |
| | | | 348/333.05 |
| 2014/0341528 A1 | 11/2014 | Mahate et al. | |
| 2015/0078606 A1 | 3/2015 | Zhang et al. | |
| 2015/0199320 A1 | 7/2015 | Ho et al. | |
| 2015/0318020 A1 | 11/2015 | Pribula et al. | |
| 2016/0014264 A1 | 1/2016 | Vim et al. | |
| 2017/0019580 A1 | 1/2017 | Boghosian et al. | |
| 2017/0104928 A1 | 4/2017 | Chase et al. | |

\* cited by examiner

F I G. 1
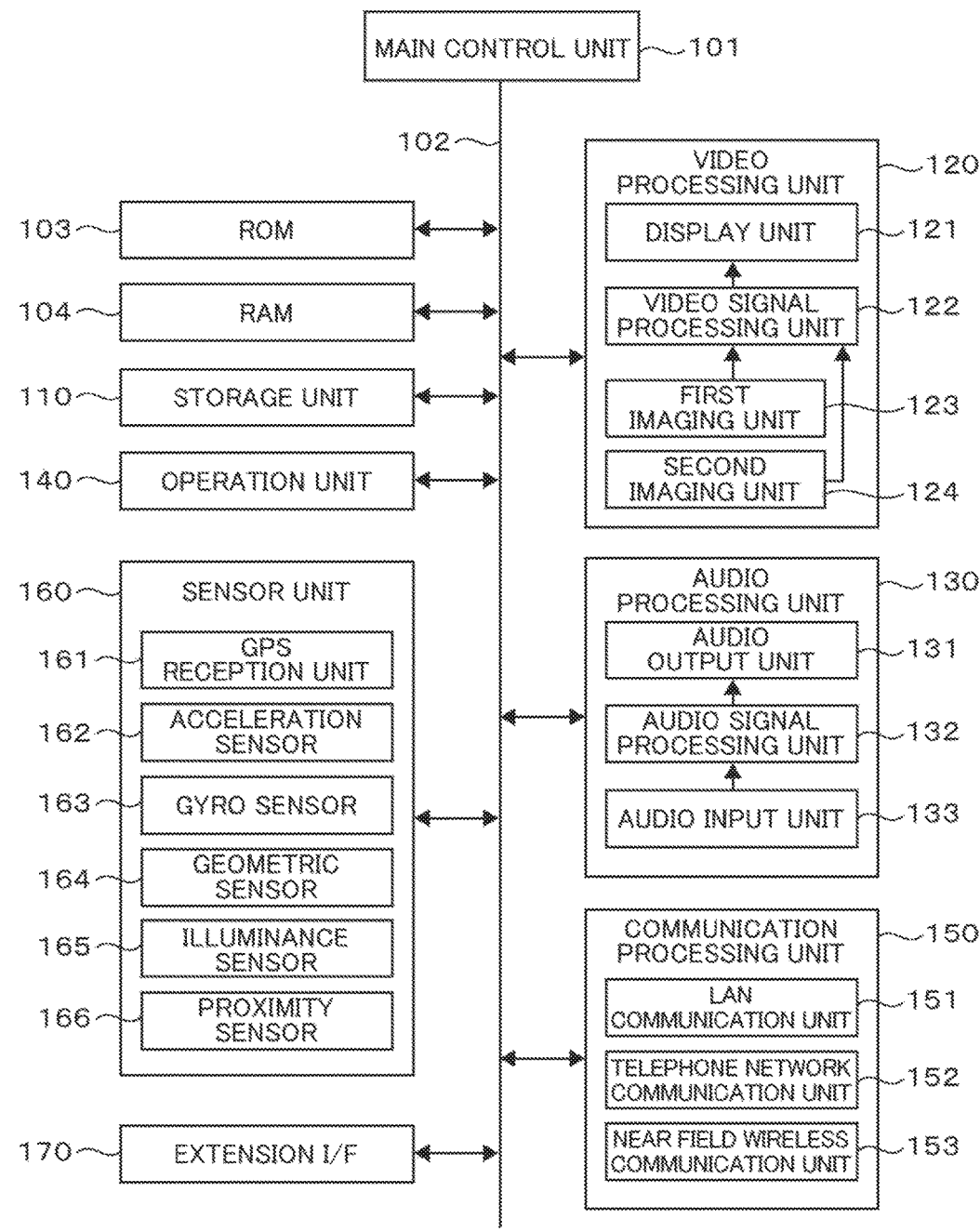

F I G. 3
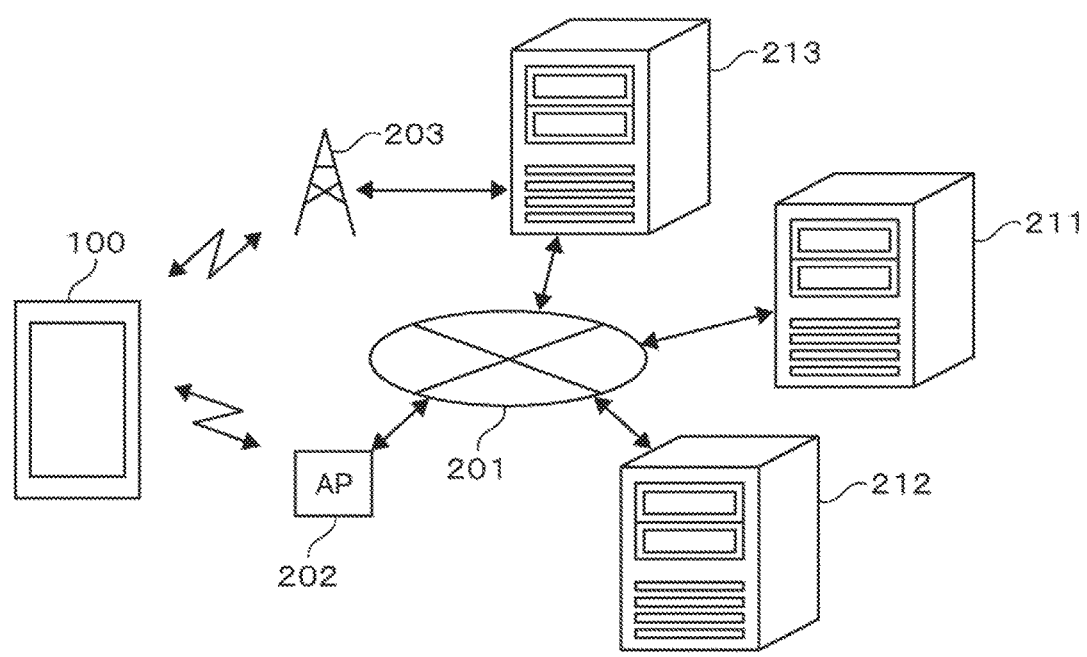

F I G. 4
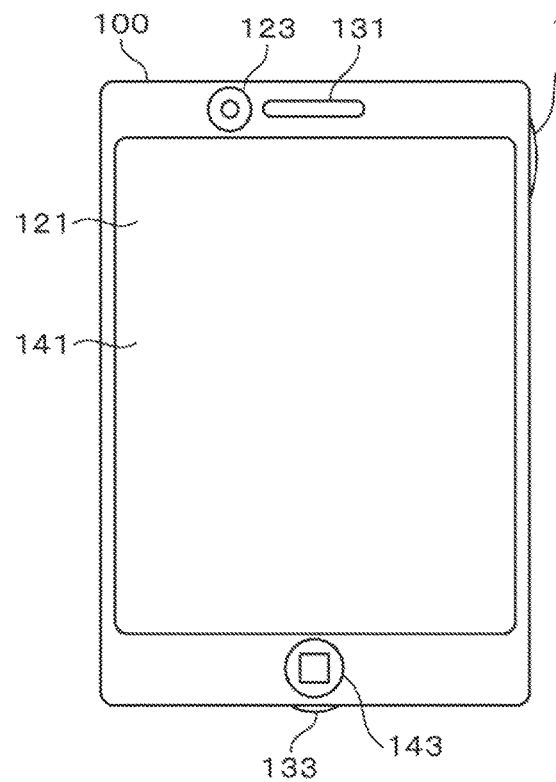
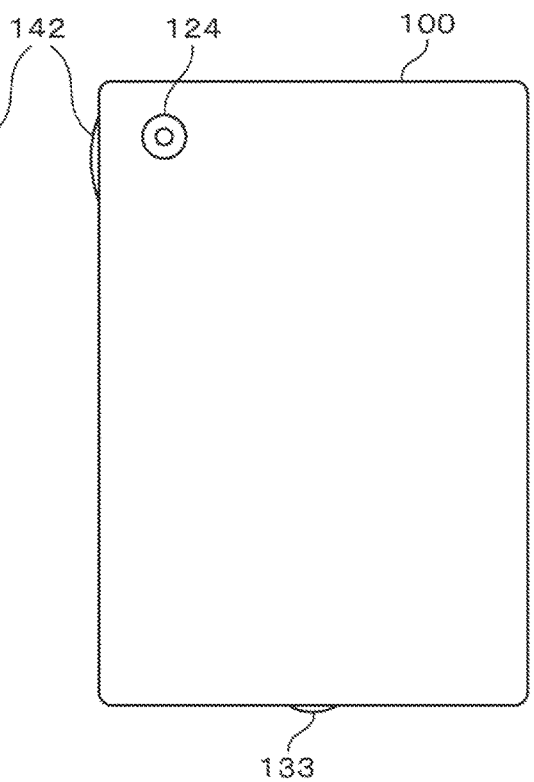

F I G. 6
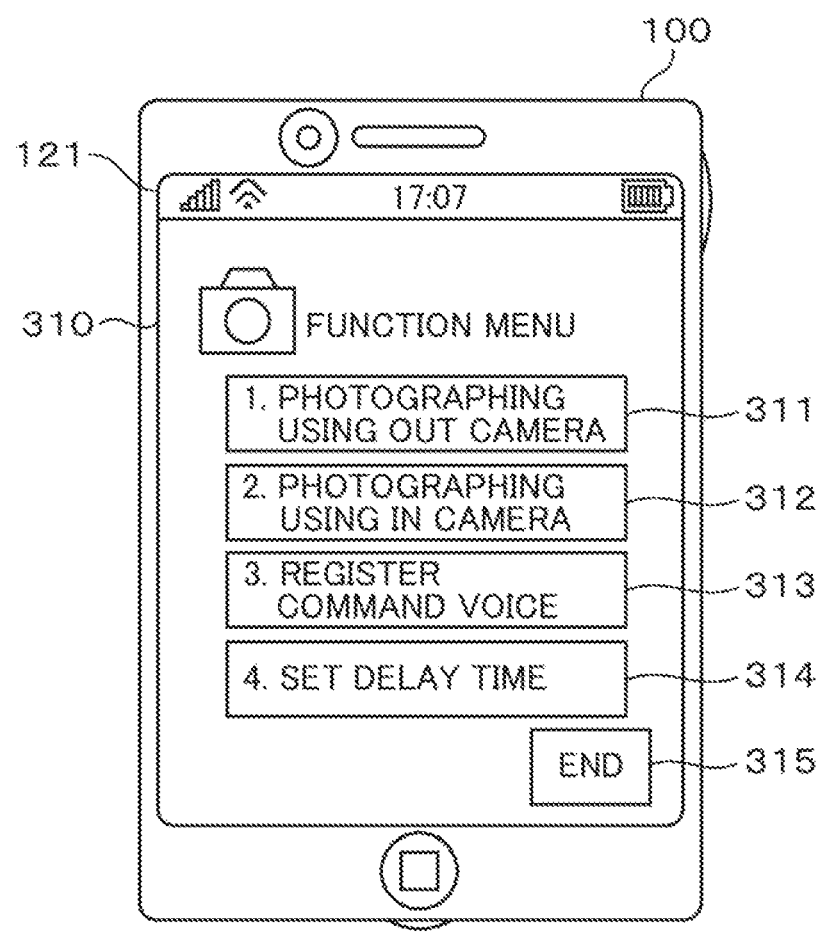

F I G. 7
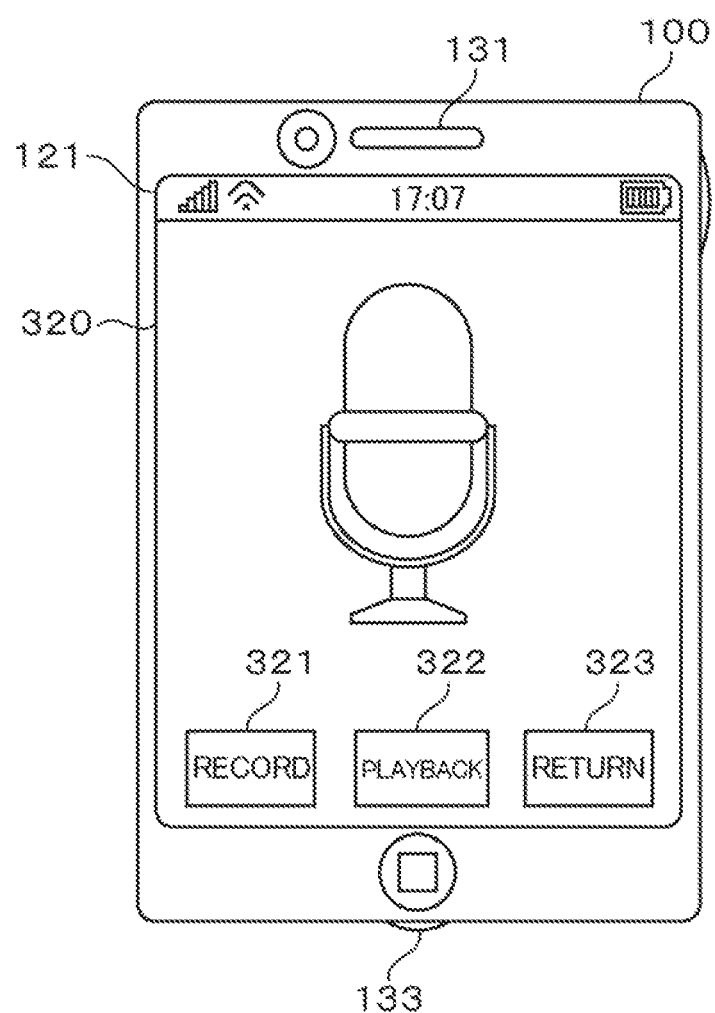

VIDEO RECORDING DEVICE AND CAMERA FUNCTION CONTROL PROGRAM

TECHNICAL FIELD

The present invention relates to a video recording device including a plurality of imaging units and a camera function control program.

BACKGROUND ART

Digital cameras each converting a subject image into an electric signal using an electronic device such as a CCD (Charge Coupled Device) and recording the converted electric signal in a memory notably spread. Recently, commonly, the functions of such digital cameras are built in information terminal devices such as a mobile phone, a smartphone, and a tablet terminal.

In a digital camera, similar to a conventional silver halide camera, the start of a recording process is triggered frequently upon an operation of pressing a shutter button. Alternatively, in an information terminal device having a digital camera function, there are also cases where the start of a recording process is triggered upon a tap operation for a shutter icon or the like displayed on a monitor unit provided with a touch panel function. Any one of the operations described above may cause a so-called "camera shake". As a means for avoiding an occurrence of the "camera shake" described above, many technologies for performing a recording process to be triggered upon voice recognition have been disclosed.

As an example thereof, in Patent Document 1, a technology has been described in which, for the purpose of allowing a voice-recognition camera to perform photographing with a natural pose in accordance with the operation of a subject, two kinds of operations including an operation of immediately performing a photographing operation when a command voice is recognized and an operation of performing a photographing operation when a predetermined time elapses after recognition are provided, and, when the command voice of the latter case is recognized, the photographing operation performed by the camera is delayed by a time set in advance.

CITATION LIST

Patent Document

Patent Document 1: JP 1-191840 A

SUMMARY OF THE INVENTION

Problems to be Solved by the Invention

According to the technology disclosed in Patent Document 1, it is described that, a predetermined delay time between the recognition of a command voice in a voice recognition camera and the start of a photographing operation of the camera is arranged, and thus, photographing can be performed in a natural pose according to the operation of a subject. However, in a case where a plurality of command voices are registered in advance, and a command voice is selectively used according to a photographing purpose, the usability of the camera is degraded, and, in a case where a command voice is incorrectly selected, anticipated photographing timing is lost.

Recently, an information terminal device (video recording device) such as a camera-attached mobile phone or a smartphone includes two camera units, one camera unit is provided on the side of a same face (front face) as that of a monitor, and the other is provided on the side of a face (rear face) that is opposite to that of the monitor. In a case where a subject is photographed using such an information terminal device, a subject located in front of a user is photographed using the camera unit (out camera) provided on the face opposite to that of the monitor, and the monitor is used as a finder. On the other hand, in the case of photographing a self-image in which the user himself is a subject, the subject is photographed using the camera unit (in camera) provided on the same face as that of the monitor, and the monitor is used for checking the self-image.

In an information terminal device (video recording device) including such two camera units, a case will be considered in which the start of photographing (the start of recording) is triggered upon a voice uttered by a user. First, in a case where a subject located in front of a user is photographed using the out camera, when voice recognition is made, the photographing process is immediately started, and, generally, there is no problem. On the other hand, in a case where a self-image is photographed using the in camera, when voice recognition is made, and immediately the photographing process is started, there is a problem in that the user is photographed with the form of his mouth to be in a state immediately after the utterance of the command voice. In order to avoid this, it is necessary to delay the start of the photographing process after the voice recognition by a predetermined time.

In this way, in a case where a voice recognition function is applied to an information terminal device (video recording device) including two cameras of the out camera and the in camera, in order to photograph a subject in a natural pose, it is necessary to adjust photographing timing depending on which camera is used. Such problems have not been disclosed or suggested in conventional technologies including Patent Document 1.

An object of the present invention is to enable photographing of a subject with a natural pose using a video recording device including a plurality of imaging units such as an out camera and an in camera and improving the usability of the video recording device in consideration of the problems described above.

Solutions to Problems

As a means for solving the problems described above, technologies described in the claims are used. In other words, according to the present invention, there is provided a video recording device that includes an imaging unit, a display unit, and a recording unit, displays a video signal input from the imaging unit on the display unit, and records the video signal using the recording unit, the imaging unit including a first imaging unit that is arranged on a same face as that of the display unit of a casing of the device and a second imaging unit that is arranged on a face different from that of the display unit of the casing of the device, the video recording device including: an operation unit that selects one of the first imaging unit and the second imaging unit to be enabled; an audio input unit that inputs a command voice giving an instruction for recording the video signal; and a control unit that causes the recording unit to start a process of recording a video signal input from the imaging unit enabled by the operation unit in accordance with the command voice input to the audio input unit, the control unit differently setting a delay time until start of the recording process performed by the recording unit after input of the command voice in accordance with the imaging unit enabled by the operation unit. Here, the control unit sets the delay time of a case where the first imaging unit is enabled by the operation unit to be longer than the delay time of a case where the second imaging unit is enabled.

Effects of the Invention

According to the present invention, photographing of a subject can be performed with a natural pose using a video recording device including a plurality of imaging units such as an out camera and an in camera, and the usability of the video recording device can be improved.

BRIEF DESCRIPTION OF THE DRAWINGS

FIG. 1 is a block diagram that illustrates a video recording device according to one embodiment of the present invention.

FIG. 3 is a diagram that illustrates the configuration of a communication system including the video recording device 100.

FIG. 4 is a diagram that illustrates the external view of the video recording device 100.

FIG. 6 is a diagram that illustrates an example of a camera function selection screen.

FIG. 7 is a diagram that illustrates an example of a command voice registration screen.

MODE FOR CARRYING OUT THE INVENTION

Figure 2:
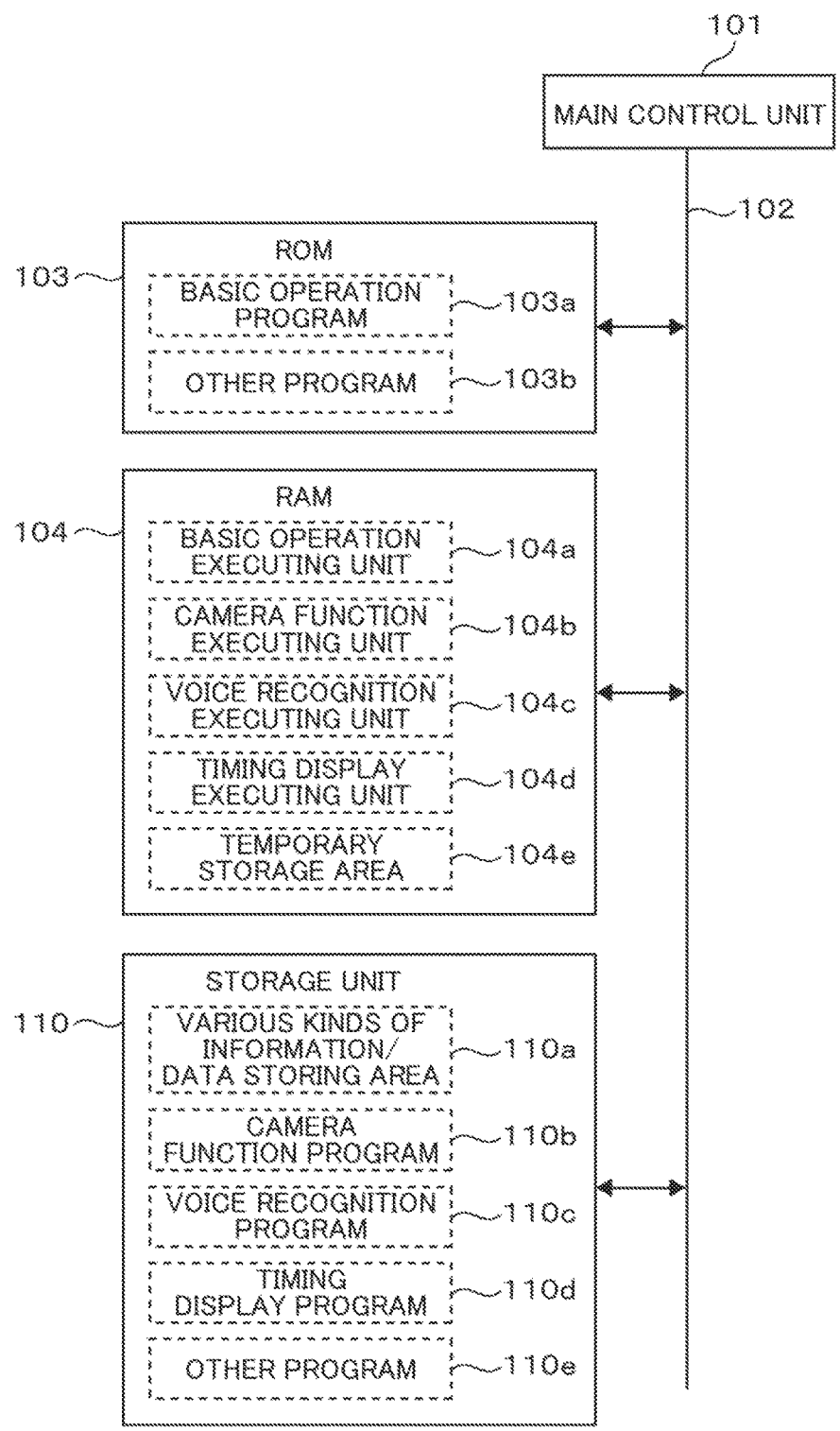
FIG. 2 is a software configuration diagram of a video recording device 100.

Hereinafter, embodiments of the present invention will be described with reference to the drawings. In description presented below, a device to which the present invention is applied will be referred to as a "video recording device" and may be a recording device that records video signals from a plurality of cameras (an out camera and an in camera) on a recording medium. More specifically, in addition to any one of a camera-attached mobile phone and a smartphone enabling a phone call with an external device using a telephone network communication unit, a tablet terminal, and the like, the device may be a digital still camera recording images by using one still image as a unit, a personal digital assistants (PDA) that transmits/receives information to/from an external device through wireless communication by using a wireless communication unit, or a notebook PC (personal computer). In addition, the device may be a video camera capable of capturing a moving image, a portable gaming device, or the like or any other portable digital device.

FIG. 1 is a block diagram that illustrates a video recording device according to one embodiment of the present invention. Here, a case where the video recording device 100 is a smartphone or a tablet terminal will be considered. The video recording device 100 includes: a main control unit 101; a system bus 102; a ROM 103; a RAM 104; a storage unit 110; a video processing unit 120; an audio processing unit 130; an operation unit 140; a communication processing unit 150; a sensor unit 160; and an extension interface unit 170.

The main control unit 101 is a microprocessor unit that controls the overall operation of the video recording device 100 in accordance with a predetermined program. The system bus 102 is a data communication path used for performing data transmission/reception between the main control unit 101 and each unit arranged inside the video recording device 100.

The ROM (Read Only Memory) 103 is a memory in which a basic operation program such as an operating system and other application programs are stored and, for example, a rewritable ROM such as an EEPROM (Electrically Erasable Programmable ROM) or a flash ROM is used. The RAM (Random Access Memory) 104 becomes a work area at the time of executing the basic operation program or any other application program. The ROM 103 and the RAM 104 may be integrally configured with the main control unit 101.

The storage unit 110 stores still-image data, a moving-image data, or the like captured by the video recording device 100. In addition, the storage unit 110 stores each operation setting value of the video recording device 100, user information (command voice data) of the video recording device 100, and the like. Furthermore, the storage unit 110 stores various programs used for realizing a camera function, and such programs are executed in the RAM 104. The storage unit 110 needs to maintain stored information even in a state in which power is not supplied to the video recording device 100, and thus, for example, a device such as a flash ROM, an SSD (Solid State Drive), or an HDD (Hard Disc Drive) is used.

The video processing unit 120 is configured by: a display unit 121; a video signal processing unit 122; a first imaging unit 123; and a second imaging unit 124. The display unit 121, for example, is a display device such as a liquid crystal panel and provides video data processed by the video signal processing unit 122 for a user by displaying the video data. The video signal processing unit 122 includes a video RAM not illustrated in the diagram and displays input video data on the display unit 121. In addition, the video signal processing unit 122 performs a format conversion, a superimposition process of a menu or any other OSD (On Screen Display) signal, and the like as is necessary. Each of the first imaging unit 123 and the second imaging unit 124 is an independent camera unit and acquires video data of a subject by converting light input from a lens using an electronic device such as a CCD or a CMOS (Complementary Metal Oxide Semiconductor) sensor into an electric signal. As will be described later, for example, the first imaging unit 123 used as an in camera photographing the user himself, and the second imaging unit 124 used as an out camera photographing a subject disposed on the periphery are selectively used. While a configuration including two imaging units is employed here, a plurality of imaging units may be included as long as two functions of the in camera and the out camera are included therein. In addition, a configuration may be employed in which the second imaging unit 124 is configured as a unit that is separate from the video recording device 100 and is connected to the video recording device 100 through wired communication or wireless communication.

The audio processing unit 130 is configured by: an audio output unit 131; an audio signal processing unit 132; and an audio input unit 133. The audio output unit 131 is a speaker and outputs an audio processed by the audio signal processing unit 132. The audio input unit 133 is a microphone and inputs audio data by converting a command voice of a user and the like into the audio data. Here, a configuration may be employed in which the audio input unit 133 is configured as a unit that is separate from the video recording device 100 and is connected to the video recording device 100 through wired communication or wireless communication.

The operation unit 140 is a part to which a user's operation instruction for the video recording device 100 is input. For example, the operation unit 140 is configured by a touch panel that is arranged to be superimposed on the display unit 121 or operation keys in which button switches are aligned. As the function of the touch panel, a function included in the display unit 121 may be used. In addition, an operation may be performed using a keyboard connected to the extension interface unit 170 to be described later or the like. Furthermore, an operation may be performed using a separate information terminal device connected through wired communication or wired communication.

The communication processing unit 150 is configured by: a LAN (Local Area Network) communication unit 151; a mobile telephone network communication unit 152; and a near-field wireless communication unit 153. The LAN communication unit 151 is connected to a wireless communication access point of the Internet through wireless communication and performs transmission/reception of data. The mobile telephone network communication unit 152 performs telephone communication (phone call) and transmission/reception of data through wireless communication with a base station of a mobile telephone network. The near-field wireless communication unit 153 performs wireless communication at the time of an approach of a corresponding reader/writer. Each of the LAN communication unit 151, the mobile telephone network communication unit 152, and the near-field wireless communication unit 153 includes a coding circuit, a decoding circuit, an antenna, and the like. In addition, an infrared communication unit and the like may be included therein.

The sensor unit 160 is a sensor group used for detecting the state of the video recording device 100 and is configured by: a GPS (Global Positioning System) reception unit 161; an acceleration sensor 162; a gyro sensor 163; a geometric sensor 164; an illuminance sensor 165; and a proximity sensor 166. By using such a sensor group, the position, the movement, the inclination, and the azimuth of the video recording device 100, ambient brightness, a proximity situation of surrounding objects, and the like are detected. In addition, any other sensor may be included therein.

The extension interface unit 170 is an interface group used for extending the function of the video recording device 100 and is configured by: a video/audio interface; a USB (Universal Serial Bus) interface; a memory interface; and the like. The video/audio interface performs input of a video signal/audio signal from an external video/audio output device, output of a video signal/audio signal to an external video/audio input device, and the like. The USB interface connects a keyboard or other USB devices. The memory interface connects a memory card or any other memory medium and performs transmission/reception of data.

In addition, a configuration of a digital television broadcast reception function, an electronic money payment function, or the like may be added to the information terminal device such as a smartphone or a tablet terminal. The video recording device 100 illustrated in FIG. 1 is assumed to be an information terminal device and thus includes configurations such as the communication processing unit 150 and the sensor unit 160 that are not essential for the execution of the present invention, and, also in the case of a configuration not including such configurations, the operations according to the present invention can be performed.

FIG. 2 is a software configuration diagram of the video recording device 100 according to this embodiment and illustrates the software configurations of the ROM 103, the RAM 104, and the storage unit 110.

In the ROM 103, a basic operation program 103*a* such as an operating system and other application programs 103*b* are stored. By updating the programs stored in the ROM 103, the versions of the basic operation program and the other application programs can be upgraded, and functional expansion thereof can be made.

The RAM 104 is a work area when various programs are executed and is configured by: a basic operation executing unit 104*a*; a camera function executing unit 104*b*; a voice recognition executing unit 104*c*; a timing display executing unit 104*d*; and a temporary storage area 104*e*, and the like. For example, the basic operation executing unit 104*a* is configured as the basic operation program 103*a* stored in the ROM 103 is expanded into the RAM 104, and the expanded basic operation program is executed by the main control unit 101. The camera function executing unit 104*b*, the voice recognition executing unit 104*c*, and the timing display executing unit 104*d* are configured as a camera function program 110*b*, a voice recognition program 110*c*, and a timing display program 110*d* stored in the storage unit 110 are expanded into the RAM 104 and are executed by the main control unit 101. The temporary storage area 104*e* is an area in which data is temporarily maintained as is necessary when various application programs are executed. A distinctive feature of this embodiment is a camera operation (recording start timing switching) performed by the camera function executing unit 104*b*, the voice recognition executing unit 104*c*, and the timing display executing unit 104*d*.

The storage unit 110 includes a various information/data storing area 110*a* and stores the camera function program 110*b*, the voice recognition program 110*c*, and the timing display program 110*d* therein. In the various information/data storing area 110*a*, still-image data, moving-image data, and the like captured by the video recording device 100 are stored, and each operation setting value of the video recording device 100, user's information, and the like are stored. The camera function program 110*b* performs control of switching of a delay time until recording starts in accordance with one of the first imaging unit 123 and the second imaging unit 124 to be used. The voice recognition program 110*c* is used for registering a user's voice and recognizing whether or not a command voice input as a trigger operation is correct. The timing display program 110*d* is used for displaying timing of recording start on the screen when the recording start is delayed. Here, the programs 110*b* to 110*d* described above may be integrated into only one program having the functions thereof.

In addition, the ROM 103 may not have an independent configuration as illustrated in FIGS. 1 and 2 but may use a partial storage area (other programs 110e) inside the storage unit 110. Furthermore, the camera function executing unit 104b, the voice recognition executing unit 104c, and the timing display executing unit 104d may be configured by hardware realizing equivalent operations.

FIG. 3 is a diagram that illustrates the configuration of a communication system including the video recording device 100 according to this embodiment. The video recording device 100 is connected to a wide-area public network 201 such as the Internet through a wireless communication access point 202. In addition, the video recording device 100 is connected to a mobile telephone communication server 213 through a base station 203 of a mobile telephone communication network. An application server 211, an image data server 212, and a mobile telephone communication server 213 are connected to the wide-area public network 201. In the communication processing unit 150 of the video recording device 100, the LAN communication unit 151 is connected to the wireless communication access point 202 of the Internet 201 and performs transmission/reception of data. In addition, the mobile telephone network communication unit 152 is connected to the base station 203 of the mobile telephone communication network and performs transmission/reception of data.

By using such a communication system, the video recording device 100 can download a new application program from the application server 211 through the Internet 201 and the wireless communication access point 202 or the base station 203 of the mobile telephone communication network. At this time, the downloaded new application program is stored in the storage unit 110. The main control unit 101 expands the new application program stored in the storage unit 110 into the RAM 104 and executes the new application program, thereby realizing a new function of the video recording device 100, whereby a function expansion can be made.

Each of the programs described above may be in the state of being stored in the ROM 103, the storage unit 110, or the like of the video recording device 100 in advance at a time point of product shipment. Alternatively, after the product shipment, the programs may be acquired from the application server 211 or the like on the Internet 201 through the LAN communication unit 151 or the mobile telephone network communication unit 152. Furthermore, the programs stored in a memory card or the like may be acquired through the extension interface unit 170.

FIG. 4 is a diagram that illustrates the external view of the video recording device 100 according to this embodiment. Here, a case is illustrated in which the video recording device 100 is an information terminal device such as a smartphone, (a) is a diagram of a front face, and (b) is a diagram of a rear face (back face). On the front face side of the video recording device 100, a display unit 121 is arranged. The first imaging unit (camera unit) 123 is arranged on a same face (front face) as that of the display unit 121, and the second imaging unit (camera unit) 124 is arranged on a face (rear face) opposite to the display unit 121. Hereinafter, the first imaging unit 123 arranged on the same face as that of the display unit 121 will be referred to as an "in camera", and the second imaging unit 124 arranged on the side opposite to the display unit 121 will be referred to as an "out camera". Here, the position of the second imaging unit 124 may be arranged on a side face or the like other than the same face as that of the display unit 121. The first imaging unit 123 (in camera) mainly photographs the user himself as a subject, and the second imaging unit 124 (out camera) photographs a subject disposed on the periphery.

As the operation unit 140 that receives an operation instruction from a user for the video recording device 100, various operation keys (a power key 142 and a home key 143) according to the touch panel 141 arranged to be superimposed on the display unit 121 and button switches are arranged. In addition, an audio output unit (speaker) 131 and an audio input unit (microphone) 133 are included.

Next, an example of various screens displayed on the display unit 121 in accordance with various operations of the video recording device 100 will be illustrated.

Figure 5:
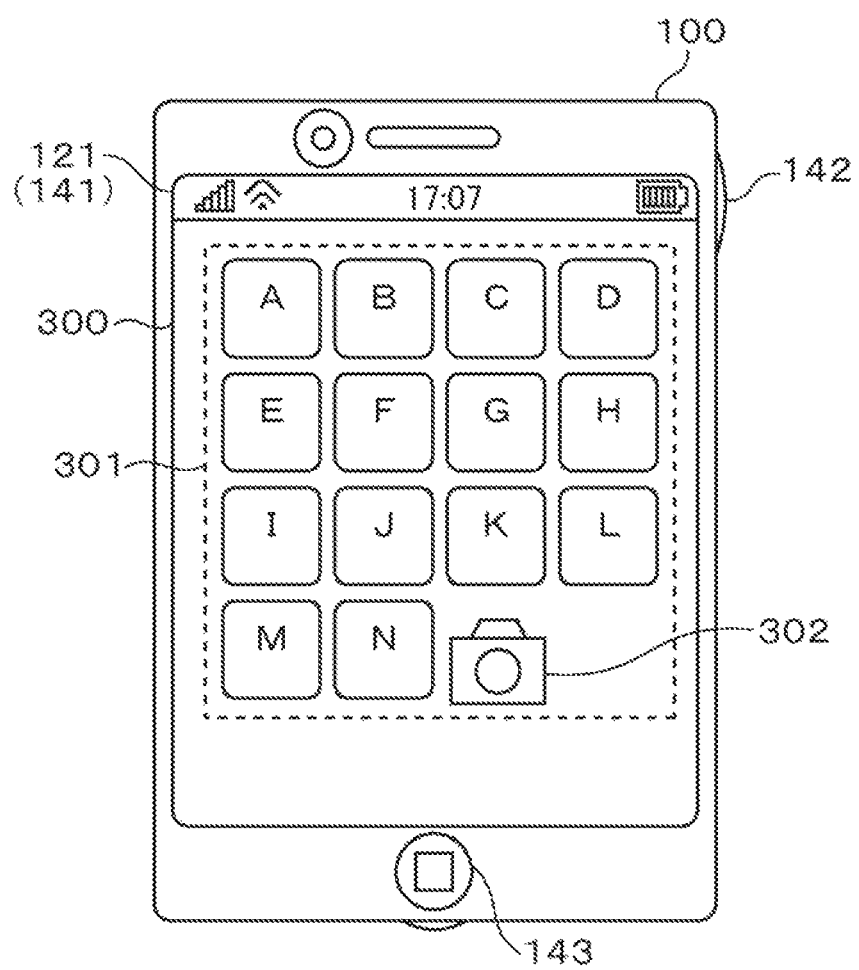
FIG. 5 is a diagram that illustrates an example of a basic screen displayed on a display unit 121.

FIG. 5 is a diagram that illustrates an example of a basic screen displayed on the display unit 121. The basic screen 300 is displayed when the power of the video recording device 100 is turned on according to pressing of the power key 142 or when the home key 143 is pressed during the execution of an arbitrary application program. An icon group 301 displayed on the basic screen 300 is a collection of icons associated with application programs that can be executed by the video recording device 100. By selecting any one of icons, a predetermined application program associated with the selected icon is executed. Among the icons, an icon 302 is an icon at the time of executing the camera function that is a distinctive feature of the video recording device 100 according to this embodiment.

The selection of an icon may be performed by performing a tap operation for an area on the touch panel 141 that corresponds to a position on the display unit 121 at which a target icon is displayed. Alternatively, an operation key such as a cross cursor key or a determination key not illustrated in the drawing may be performed.

FIG. 6 is a diagram that illustrates an example of a camera function selection screen displayed at the time of starting the camera function. The camera function selection menu screen 310 is configured by: an out camera selection icon 311 used in a case where photographing is performed using the out camera; an in camera selection icon 312 in a case where photographing is performed using the in camera; a command voice registration icon 313 used in a case where a command voice is registered; a delay time setting icon 314 used in a case where a recording start delay time is set; and an end icon 315. A user selects a camera in accordance with a photographing target. Alternatively, in a case where a command voice is not registered, before the photographing process, a command voice is registered.

FIG. 7 is a diagram that illustrates an example of a command voice registration screen displayed when a command voice is registered. The command voice registration screen 320 is configured by: a recording start/stop icon 321; a playback start/stop icon 322; and a return icon 323. At the time of recording, the recording start/stop icon 321 is selected, and a voice uttered by the user is input from the audio input unit 133 and is stored. At the time of playback, the playback start/stop icon 322 is selected, and the stored user's voice is output from the audio output unit 131.

Figure 8:
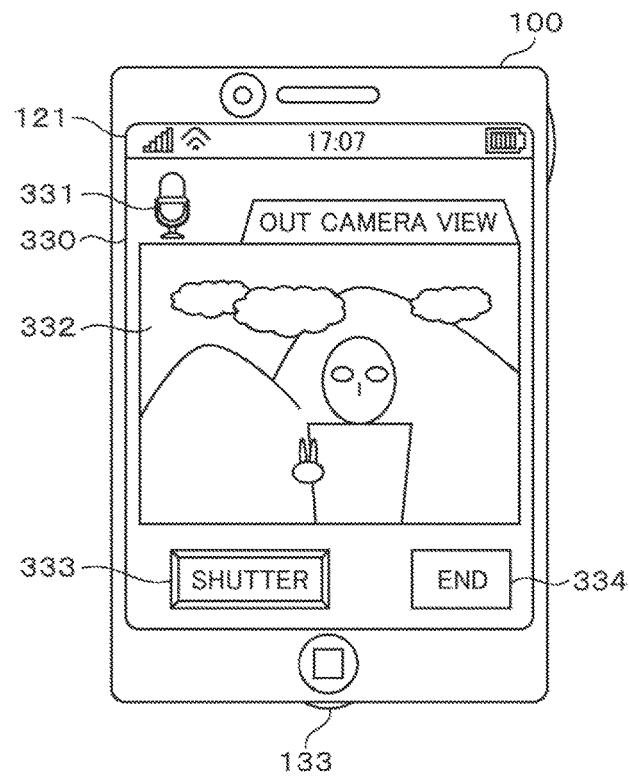
FIG. 8 is a diagram that illustrates an example of a live view display screen.

FIG. 8 is a diagram that illustrates an example of a live view display screen displaying a camera video. The live view display screen 330 is configured by: a command voice reception icon 331; a live view window 332; a shutter icon 333; and an end icon 334.

The live view window 332 displays video data input from the first imaging unit 123 (in camera) or the second imaging unit 124 (out camera) as it is. In this example, an out camera view input from the second imaging unit 124 is displayed. A user adjusts the layout and the like of a subject to be captured while checking a video displayed in the live view window 332. In addition, by performing a touch panel operation such as pinch-out/in at a position located at an upper part of the live view window 332, zoom-in/out of a displayed video is controlled.

The command voice reception icon 331 represents that a recording process can be started by using a command voice input from the audio input unit 133 as a trigger. In other words, by displaying the icon 331, it represents that the voice input function is enabled (alternately, the voice input function may be represented to be enabled by changing the shape of the icon 331). The shutter icon 333 is used for starting a recording process by using the selection of the shutter icon as a trigger. The user can use both the audio input unit 133 and the shutter icon 333 as a trigger for starting a recording process. In addition, whether or not the function for using a voice input as a trigger is enabled can be selected by the user.

Hereinafter, the camera function (an operation for delaying the start of recording) that is a distinctive feature of the video recording device 100 according to this embodiment will be described.

In a general subject photographing process, it is preferable that a delay time until the start of a recording process after a shutter operation (in this embodiment, including the input of a command voice used as a trigger for starting a recording process) is as close as possible to zero. However, in a case where the user himself is photographed (self-image photographing) using a camera that starts a recording process using a voice input as a trigger, such a delay time is not preferable since the user is photographed with his mouth in a state immediately after the utterance of a command voice in that case. In order to avoid this, in this embodiment, a predetermined delay time until the start of a recording process after the input of a command voice is provided. In other words, a control process is performed such that switching to a delay time until the start of recording after detection of a trigger for starting the recording process is made in accordance with a photographing target (an external subject/a self-image) or a photographing method (the out camera/the in camera).

Figure 9:
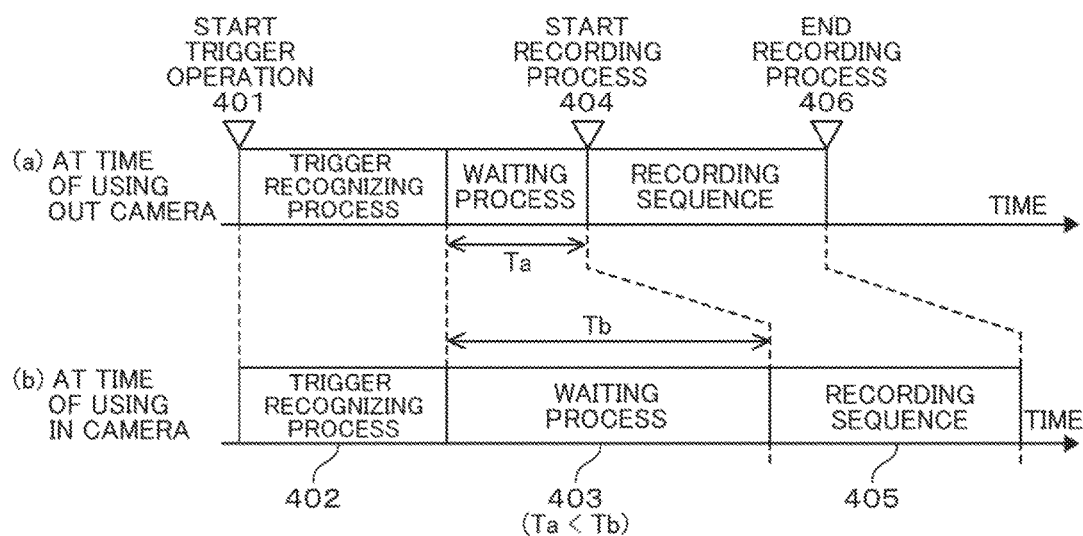
FIG. 9 is a diagram that illustrates a process of controlling switching between recording start delay times.

FIG. 9 is a diagram that illustrates a process of controlling switching between recording start delay times. The video recording device 100 according to this embodiment performs the process of controlling switching between delay times in accordance with which one of the two cameras is used.

In a control sequence, when a trigger operation start 401 (an input of a command voice) is received, after a trigger recognition process 402 (a process of recognizing a command voice) and a standby process 403 of a predetermined time are performed, a recording process start 404 is performed. Then, a predetermined recording sequence 405 (storage of video data) is executed, and a recording process end 406 is performed.

As illustrated in (a), in a case where a subject is photographed using the second imaging unit 124 (out camera), a standby process 403 of a standby time Ta is performed. On the other hand, as illustrated in (b), in a case where a subject is photographed using the first imaging unit 123 (in camera), a standby process 403 of a standby time Tb is performed. Here, the standby times of both the cases are different from each other, and the standby time Tb is set to be longer than the standby time Ta (Ta<Tb). Accordingly, a delay time until the recording process start 404 from the trigger operation start 401 is longer at the time of using the in camera illustrated in (b) than at the time of using the out camera illustrated in (a). In this way, the delay time is automatically switched over in accordance with selection of one of the second imaging unit 124 (out camera) and the first imaging unit 123 (in camera). Therefore, an optimal video corresponding to a photographing target (an external subject/a self-image) can be recorded.

Here, in the delay time until the recording process start 404 from the trigger operation start 401, the trigger recognition process 402 and the standby process 403 are included. In the trigger recognition process 402, a process of inputting a command voice from the audio input unit 133 and a process of checking the data matching ratio between voice data of the command voice input by the voice recognition executing unit 104c and voice data of the recorded command voice are included. Accordingly, a time required for the trigger recognition process 402 is not basically zero. Meanwhile, the standby process 403 is a process that is intentionally inserted for adjusting the timing of the recording process start 404. Thus, when the second imaging unit 124 (out camera) is used, in order to further decrease the delay time, it is preferable that the standby time Ta of the standby process 403 is close to zero.

While fixed values different from each other may be set to the standby time Ta at the time of using the out camera illustrated in (a) and the standby time Tb at the time of using the in camera illustrated in (b) in advance, arbitrary values may be set thereto by the user. In a case where the setting is made by the user, a method may be used in which the standby times are selected from among a plurality of values prepared in advance. Also in such a case, it is apparent that the standby time Tb is set to be longer than the standby time Ta. The delay time setting icon 314 illustrated in FIG. 6 is used for the user to set the delay times (standby times).

In the recording sequence 405, not only the process of recording video data in the storage unit 110 (or the image data server 212 or any other memory device), but focusing of a camera unit, an exposure process, an A/D conversion process for the output of a CCD/CMOS sensor, a gamma correction, noise elimination, and image compression process are performed.

According to this embodiment, compared to a case as illustrated in Patent Document 1 described above in which a plurality of command voices are prepared in advance, and the timing at which a recording process is started is delayed in accordance with a command voice, there is no risk of losing the photographing timing due to erroneous selection of a command voice. In addition, compared to a camera device having a plurality of photographing modes (for example, an ordinary mode and a self-timer mode) having mutually-different delay times, checking/selecting of the mode do not need to be performed at each photographing time, and accordingly, the usability is improved.

Next, the flow of the camera operation of the video recording device 100 according to this example will be described in detail. Here, general operations/manipulations as a camera device such as focusing and exposure are known, and thus description thereof will not be presented. In addition, in order to simplify the description, processes performed by the main control unit 101 expanding various programs stored in the ROM 103 and the storage unit 110 into the RAM 104 and executing the programs will be described as processes executed by the executing units 104a to 104d of the RAM 104.

Figure 10:
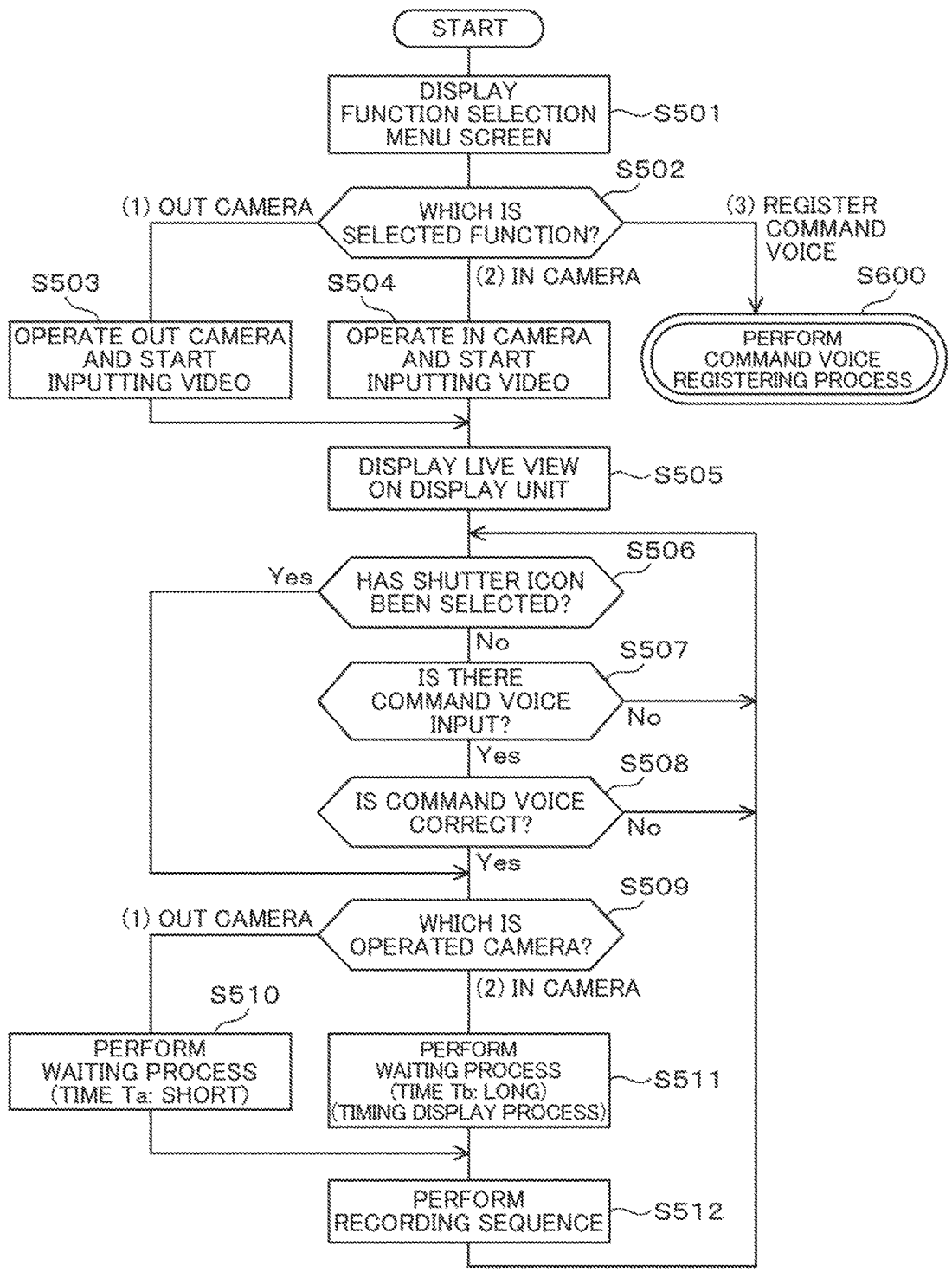
FIG. 10 is a flowchart that illustrates the flow of a camera operation of the video recording device 100.

FIG. 10 is a flowchart that illustrates the flow of the camera operation of the video recording device 100. When the icon 302 is selected on the basic screen 300 illustrated in FIG. 5, the basic operation executing unit 104a operates the camera function executing unit 104b and transfers the control subject to the camera function executing unit 104b.

The camera function executing unit 104b displays the camera function selection menu screen 310 illustrated in FIG. (S501) and determines a function menu (icon) that has been selected by the user (S502).

In S502, in a case where the user selects (1) the out camera selection icon 311, the camera function executing unit 104b enables the second imaging unit 124, starts inputting video data from the out camera (S503), and displays the input video data on the display unit 121 as a live view (S505). On the other hand, in a case where the user selects (2) the in camera selection icon 312, the camera function executing unit 104b enables the first imaging unit 123, starts inputting video data from the in camera (S504), and displays the input video data on the display unit 121 as a live view (S505).

In S502, in a case where the user selects (3) the command voice registration icon 313, the camera function executing unit 104b operates the voice recognition executing unit 104c and executes a command voice registration process (S600). This command voice registration process (S600) will be additionally described with reference with FIG. 11. In addition, in S502, in a case where the user selects the end icon 315 (not illustrated in the drawing), the camera function executing unit 104b returns the control subject to the basic operation executing unit 104a. The basic operation executing unit 104a displays the basic screen 300 and ends the operation of the camera function executing unit 104b.

In S505, the camera function executing unit 104b displays the live view display screen 330 illustrated in FIG. 8 and operates the voice recognition executing unit 104c. Then, it is determined whether the user has selected the shutter icon 333 as a trigger operation (S506) or whether there is a command voice input from the audio input unit 133 (S507). In S506, in a case where the user selects the shutter icon 333, the process proceeds to S509.

In S507, in a case where the input of a command voice from the audio input unit 133 is detected, the camera function executing unit 104b transmits the voice data of the input command voice to the voice recognition executing unit 104c. The voice recognition executing unit 104c compares the voice data of the input command voice with the voice data of the registered command voice that is registered in the various information/data storing area 110a of the storage unit 110 and determines whether or not the input command voice is correct (S508). More specifically, the voice recognition executing unit 104c acquires a data matching ratio between the voice data of the input command voice and the voice data of the registered command voice and determines whether or not the matching ratio is a predetermined threshold or more. A result of the determination is transmitted to the camera function executing unit 104b, and, when the command voice is correct, the process proceeds to S509. On the other hand, when the command voice is incorrect, the voice data of the input command voice is discarded, the process is returned to S506, and again, the process stands by for selection of the shutter icon 333 or input of a new command voice (S507).

In S509, the camera function executing unit 104b checks whether the camera that is currently operated is the the first imaging unit 123 (in camera) or the second imaging unit 124 (out camera) (in other words, whether the icon selected in S502 is the out camera selection icon 311 or the in camera selection icon 312).

In a case where (1) the out camera is operated, the camera function executing unit 104b executes a predetermined standby process (the standby time Ta: short) (S510) and then, starts a recording sequence (S512). On the other hand, in a case where (2) the in camera is operated, the camera function executing unit 104b executes a predetermined standby process (the standby time Tb: long) (S511) and then, starts a recording sequence (S512). In the standby process of S511, a timing display process to be described later with reference to FIG. 13 may be performed together. When the recording sequence of S512 ends, the process is returned to S506, and a standby process for a next trigger operation is performed.

In this way, in the camera operation according to this embodiment, the recording process is started using a command voice input to the audio input unit 133 or the process of selecting the shutter icon 333 as a trigger. At that time, in accordance with the out camera or the in camera that is operated, a delay time until the start of recording from timing at which the trigger is received is automatically switched over.

In addition, the determination of the input voice in S508 may be performed based not only on the comparison of the matching ratio of the voice data but also on a detailed comparison of voice print data or the like or a comparison based on only matching between keywords. In a case where the detailed comparison is made based on the voice print data or the like, only a user who has performed the command voice registration process can use the video recording device 100, whereby the security is improved. On the other hand, in a case where the comparison is made based on only keywords, anyone including the user can use the video recording device 100, whereby the usability is improved. Thus, it may be configured such that whether the use is limited to a specific user or not is determined by performing switching between comparison methods in accordance with a use environment.

Figure 11:
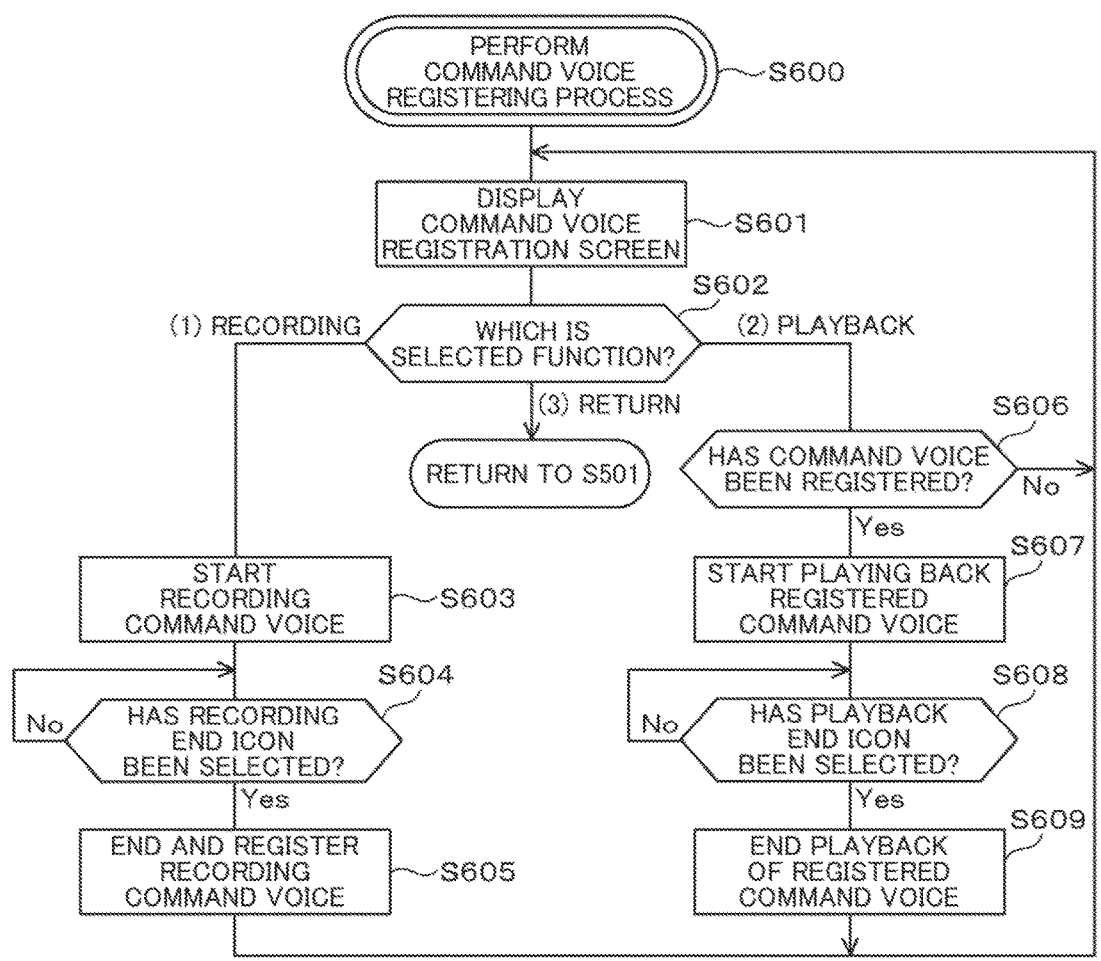
FIG. 11 is a flowchart that illustrates the flow of a command voice registration process (S600).

FIG. 11 is a flowchart that illustrates the flow of the command voice registration process (S600) illustrated in FIG. 10.

The camera function executing unit 104b operates the voice recognition executing unit 104c, displays the command voice registration screen 320 illustrated in FIG. 7 (S601), and determines an icon disposed within the screen that is selected by the user (S602). In a case where the user selects the recording start/stop icon 321 of "(1)", the process proceeds to S603, and an operation of recording a command voice is performed. In a case where the user selects the playback start/stop icon 322 of "(2)", the process proceeds to S606, and an operation of playing back a command voice is performed. In a case where the user selects the return icon 323 of "(3), the camera function executing unit 104b ends the operation of the voice recognition executing unit 104c, and the process proceeds to S501 illustrated in FIG. 10.

In the recording operation of S603, the camera function executing unit 104b starts a process of recording a voice signal input from the audio input unit 133. Then, when it is detected that the user selects the recording start/stop icon 321 again during the execution of the recording process (S604), the process of recording a voice signal input from the audio input unit 133 ends. The voice recognition executing unit 104c registers recorded voice data in the various information/data storing area 110a of the storage unit 110 as a command voice under the control of the camera function executing unit 104b (S605). Thereafter, the camera function executing unit 104b moves the control to S601.

In the playback operation of S606, the voice recognition executing unit 104c checks whether or not the command voice is registered in the various information/data storing area 110a of the storage unit 110 under the control of the camera function executing unit 104b. In a case where the command voice is registered, the voice recognition executing unit 104c reads the registered command voice from the various information/data storing area 110a, and the camera function executing unit 104b starts a process of playing back the registered command voice that has been read. A voice signal of the registered command voice that has been played back is output from the audio output unit 131 (S607). Then, when it is detected that the user selects the playback start/stop icon 322 again during the execution of the playback process (S608), the camera function executing unit 104b ends the process of playing back the registered command voice (S609). Thereafter, the camera function executing unit 104b moves the control to S601.

On the other hand, in a case where the command voice is not registered in S606, the camera function executing unit 104b displays an indication thereof on the display unit 121 and moves the control to S601. In addition, in S608, also in a case where it is not detected that the user selects the playback start/stop icon 322 again, after the process of playing back all the data of the registered command voice ends, the control is moved to S601.

According to the command voice registration process described above, a voice of a user's taste can be registered as a command voice used as a trigger for the start of a recording process, and the registered command voice can be checked.

Next, additional functions of the video recording device 100 according to this embodiment will be described.

Figure 12:
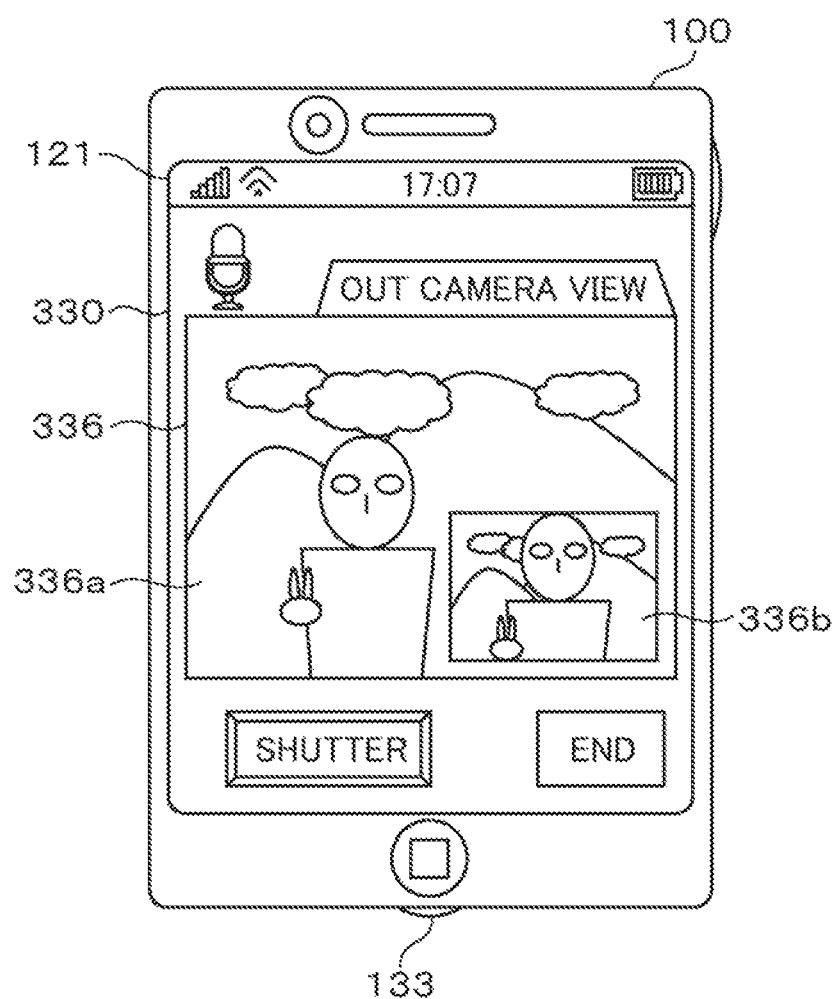
FIG. 12 is a diagram that illustrates an example of a screen on which two camera videos are composed and displayed.

FIG. 12 is a diagram that illustrates an example of a screen on which two camera videos are composed and displayed. In this case, both the first imaging unit 123 (in camera) and the second imaging unit 124 (out camera) are simultaneously enabled, and two units of video data are input. In a live view window 336 of the live view display screen 330, video data 336a input from the out camera and video data 336b input from the in camera are composed in the form of PinP (Picture in Picture) and are displayed.

A process of recording the video data composed in the form of PinP in this way is performed as below. When a trigger operation (command voice input) is received, a standby process having the standby time Ta (short) is performed for the video data 336a of the out camera, and the standby process having the standby time Tb (long) is performed for the video data 336b supplied from the in camera. Then, both the video data 336a and the video data 336b are composed and recorded. Accordingly, image data supplied from each of two cameras can be recorded in an optimal state.

However, according to the method described above, a predetermined time difference occurs between the two units of video data, and there are cases where a video after the composition becomes unnatural depending on the situation of the subject. In such a case, both the standby times are configured to coincide with each other. More specifically, the standby time Tb (long) of the in camera is also applied to the standby time of the out camera. In such a case, there is no time difference between two units of video data, and unnaturalness can be resolved. Whether the standby times of the two units of video data are configured to be the same or different from each other can be selected by the user depending on the situation of a subject by arranging a selection switch.

Figure 13:
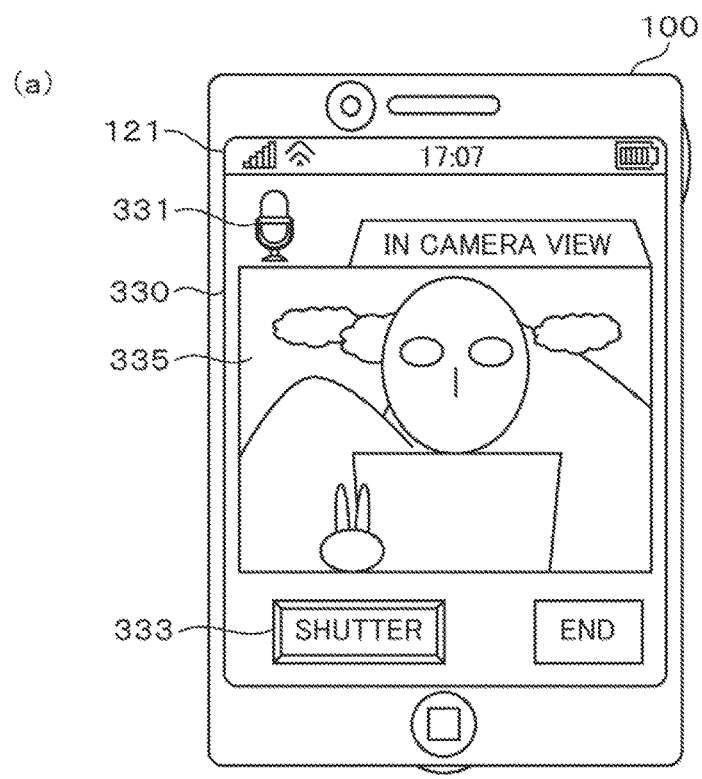
FIG. 13 is a diagram that illustrates an example of a screen on which recording timing is displayed.
Figure 13:
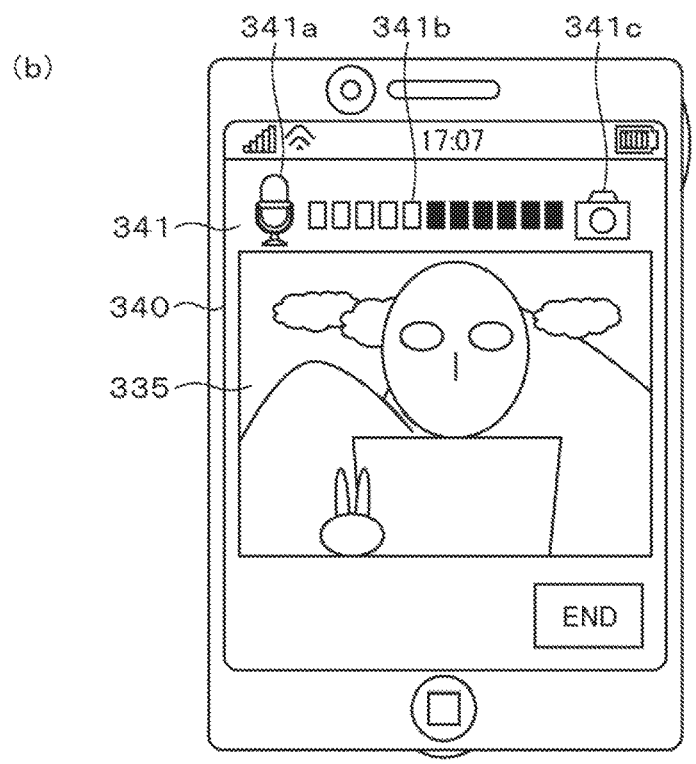

FIG. 13 is a diagram that illustrates an example of a screen on which recording timing is displayed.

As described above, in this embodiment, a delay time until the start of recording from a trigger operation (command voice input) is arranged. Particularly, in a case where a video supplied from the first imaging unit 123 (in camera) is recorded, the standby time Tb of the standby process is increased. For this reason, there are cases where the user does not know when an actual recording process is started and feels inconvenience. Thus, in order to resolve this, the timing of the start of recording is displayed on the display unit.

"(a)" illustrates a live view display screen 330 and is in a state standing by for a trigger operation while a camera video is displayed. Here, in a live view window 335, video data supplied from the in camera is displayed. In addition, in order to receive a trigger operation, a command voice reception icon 331 and a shutter icon 333 are displayed. In this state, the user utters a command voice or selects the shutter icon 333 as a trigger operation.

"(b)" illustrates a recording timing display screen 340 after the reception of a trigger operation. The command voice reception icon 331 and the shutter icon 333 used for a trigger operation are eliminated, and a timing display icon 341 is displayed by the timing display executing unit 104d. In this state, a trigger recognition process and a predetermined standby process (in this example, having the standby time Tb: long) are performed.

The timing display icon 341 is configured by: a microphone mark 341a; a progress bar 341b; and a camera mark 341c. In the progress bar 341b, a time elapse (painted white) until the start of recording is displayed. The display state is controlled by the timing display executing unit 104d and is linked to the standby process described above. In other words, the bar starts to grow from the microphone mark 341a that is a start point at a time point when the voice recognition process of a command voice is completed, and, when the bar arrives at the camera mark 341c that is an end point, the recording sequence is started. The user can easily acquire a time elapse of the standby process and the timing of the start of the recording process by visually recognizing the bar display of the progress bar 341b of the timing display icon 341.

The design of the timing display icon 341 may be variously represented. Instead of the progress bar, for example, a remaining time display according to countdown using a numerical value or an animation in the shape of an analog time can be made, and any design may be employed as long as the remaining time can be roughly perceived.

To display the recording timing display screen 340 described above is effective when the first imaging unit 123 (in camera) having a long standby time Tb is used. On the other hand, when the second imaging unit 124 (out camera) having a short standby time Ta is used, the display of the progress bar 341b instantly ends, and thus, it does not have any meaning. However, in a case where the standby time Ta is set to a large value to some degrees, the display is effective, and, thus, it is preferable that the length of the standby time is compared with a threshold, and, in a case where the length of the standby time is larger than the threshold, the recording timing display screen is displayed.

As described above, according to the video recording device 100 of this embodiment, a delay time is arranged until a recording process is started after detection of a trigger operation for the start of the recording process, and the length of the delay time is automatically switched over in accordance with one of two camera units (the out camera and the in camera) that is used. Accordingly, in a case where a recording process is started using a command voice input as a trigger or in a case where the user himself is photographed using the in camera (self-image photographing), a subject can be photographed in a natural pose. In addition, by displaying the recording timing display screen 340, also in a case where a delay time is arranged between the trigger operation and the recording process, timing at which the recording process is actually performed can be easily acquired. Accordingly, a video recording device having improved usability can be provided.

As above, while several embodiments of the present invention have been described, the configuration realizing the technology according to the present invention is not limited to the embodiments described above, and various application examples and modified examples can be made. In other words, in the embodiment described above, while an applied device has been called and described as a video recording device, more specifically, the applied device may be a mobile phone having a camera function, a smartphone, a tablet terminal, a digital still camera, a personal digital assistants (PDA), or a notebook PC. Furthermore, the applied device may be a video camera, a portable gaming device, or any other portable digital device. In addition, numerical values, display terms, and the like represented in the embodiments and the drawings are merely examples, and, in a case where they are equivalent in accordance with an applied device, the effects of the present invention are not degraded.

Some or all of the functions and the like of the present invention described above may be realized by hardware, for example, by designing them using an integrated circuit or the like. In addition, the functions and the like may be realized by software as a microprocessor unit or the like analyses and executes a program realizing each of the functions. Furthermore, hardware and software may be used together.

In addition, control lines and information lines illustrated in the drawings are lines that are considered to be necessary for the description, and it cannot be determined that all the control lines and all the information lines for products are necessarily illustrated. Actually, most of all the configurations may be considered to be connected to each other.

REFERENCE SIGNS LIST

100 Video recording device
101 Main control unit
102 System bus
103 ROM
104 RAM
104a Basic operation executing unit
104b Camera function Executing unit
104c Voice recognition executing unit
104d Timing display executing unit
110 Storage unit
120 Video processing unit
121 Display unit
122 Video signal processing unit
123 First imaging unit (in camera)
124 Second imaging unit (out camera)
130 Audio processing unit
131 Audio output unit
132 Audio signal processing unit
133 Audio input unit
140 Operation unit
150 Communication processing unit
160 Sensor unit
170 Extension interface unit
300 Basic screen
310 Camera function selection menu screen
320 Command voice registration screen
330 Live view display screen
340 Recording timing display screen

The invention claimed is:

1. A video recording device configured to execute a plurality of different photographing processes, comprising:
an audio input interface configured to receive a command voice;
a touch display arranged on a first surface of the video recording device and configured to display a video signal and receive a touch operation instruction;
a first camera arranged on the same side of the touch display and configured to photograph an object and acquire a first video signal;
a second camera arranged on an opposite side of the touch display and configured to photograph an object and acquire a second video signal;
a recorder configured to record at least one of the first video signal or the second video signal on a storage; and
a controller,
wherein the controller is configured to:
control such that one of the first camera and the second camera is enabled,
control such that, when the audio input interface receives the command voice giving a first instruction to start a recording of a video signal in a state in which the first camera is enabled, the recorder starts a recording of the first video signal on the storage in response to the first instruction,
control such that, when the touch display receives the touch operation instruction giving a second instruction to start a recording of a video signal in a state in which the second camera is enabled, the recorder starts a recording of the second video signal on the storage in response to the second instruction, and
control such that a standby time from a recognition of the first instruction to a start of the recording of the first video signal is larger than a standby time from a recognition of the second instruction to a start of the recording of the second video signal.

2. The video recording device according to claim 1, wherein the standby time controlled by the controller is arbitrarily settable or selectable by a user.

3. The video recording device according to claim 1, wherein the controller causes an elapse state of the standby time from the photographing trigger to the recording start of the video signal to the recorder unit to be displayed on the touch display.

4. The video recording device according to claim 1, wherein the recorder is configured to record the first video signal input from the first camera or the second video signal input from the second camera in an internal storage.

5. The video recording device according to claim 1, wherein the recorder is configured to record the first video signal input from the first camera or the second video signal input from the second camera in a memory medium connected to the video recording device.

6. The video recording device according to claim 1, further comprising,
a communication unit including circuitry and configured to perform communication with a server device on the Internet, wherein the recorder is configured to record the first video signal input from the first camera or the second video signal from the second camera in the server device through the communication unit.

7. The video recording device according to claim 1, further comprising, a command voice storage configured to store a command voice for instructing photographing, wherein the recorder is configured to perform control such that a command voice to be recorded in the command voice storage is received from the audio input interface and stored in the command voice storage as a command voice registration process, and in the first photographing process, the recorder determines that the command voice instructs the photographing when the command voice input to the audio input interface is identical to the command voice stored in the command voice storage, and determines that the command voice does not instruct the photographing when the command voice input to the audio input interface is not identical to the command voice stored in the command voice storage unit.

8. A video recording method of a video recording device, comprising:

selecting one of a first camera and a second camera which is to be enabled, the first camera being arranged on the same face side of a touch display and configured to photograph an object and acquire a first video signal, the second camera being arranged on an opposite side of the touch display and configured to photograph an object and acquire a second video signal;

when the first camera is selected to be enabled:

receiving a command voice from an audio input interface;

determining whether or not the command voice includes a first instruction to start a recording of a video signal;

performing a first standby process during a first predetermined time when the command voice includes the first instruction; and start recording the first video signal after the first predetermined time; and when the second camera is selected to be enabled:

receiving a touch operation instruction from the touch display;

determining whether or not the touch operation instruction includes a second instruction to start a recording of a video signal;

performing a second standby process during a second predetermined time when the touch operation instruction includes the second instruction; and start recording the second video signal after the second predetermined time;

wherein the first predetermined time is set to be larger than the second predetermined time.

* * * * *